(12) United States Patent
Berinsky

(10) Patent No.: US 10,292,340 B2
(45) Date of Patent: May 21, 2019

(54) SYSTEM AND METHOD FOR PROVIDING ILLUMINATION TO PLANTS

(71) Applicant: FLORA FOTONICA LTD, Modiin (IL)

(72) Inventor: Gennadiy Berinsky, Modiin (IL)

(73) Assignee: FLORA FOTONICA LTD., Modiin (IL)

( * ) Notice: Subject to any disclaimer, the term of this patent is extended or adjusted under 35 U.S.C. 154(b) by 414 days.

(21) Appl. No.: 14/895,596

(22) PCT Filed: Jun. 5, 2014

(86) PCT No.: PCT/IL2014/050507
§ 371 (c)(1),
(2) Date: Dec. 3, 2015

(87) PCT Pub. No.: WO2014/195952
PCT Pub. Date: Dec. 11, 2014

(65) Prior Publication Data
US 2016/0113213 A1    Apr. 28, 2016

Related U.S. Application Data

(60) Provisional application No. 61/831,775, filed on Jun. 6, 2013.

(51) Int. Cl.
*A01G 9/20* (2006.01)
*A01G 7/04* (2006.01)
(Continued)

(52) U.S. Cl.
CPC .............. *A01G 9/20* (2013.01); *A01G 7/045* (2013.01); *H05B 33/0842* (2013.01);
(Continued)

(58) Field of Classification Search
USPC .......................... 47/58.1 LS, DIG. 6, 17, 60
See application file for complete search history.

(56) References Cited

U.S. PATENT DOCUMENTS 8,850,742 B2 * 10/2014 Dube ..................... A01G 7/045
47/17
2003/0009933 A1 * 1/2003 Yoneda .................. A01G 7/045
47/1.01 R
(Continued)

FOREIGN PATENT DOCUMENTS

JP          3093486       7/2000
JP       2003-79254 A     3/2003
(Continued)

*Primary Examiner* — Andrea M Valenti
(74) *Attorney, Agent, or Firm* — Soroker Agmon Nordman

(57) ABSTRACT

The present invention discloses a system for illuminating plants in an indoor site, comprising a plurality of illumination units for emitting light in intermittent pulses; a central unit connected to the plurality of illumination units for synchronizing the operation of the plurality of illumination units, such that two or more plants clusters receive light in intermittent pulses emitted in the same time. The illumination units may contain wireless communication units and are synchronized wirelessly. The present invention also discloses adjusting an illumination plan of plants according to information of various types from a central server and adjusting the height of the illumination units accordingly. The system adjusts illumination plans according to information received from one or more sites, and predicts problematic situations from a series of images.

17 Claims, 9 Drawing Sheets

(51) Int. Cl.
  *H05B 33/08* (2006.01)
  *H05B 37/02* (2006.01)
(52) U.S. Cl.
  CPC ....... *H05B 33/0872* (2013.01); *H05B 37/029* (2013.01); *H05B 37/0227* (2013.01); *H05B 37/0245* (2013.01); *H05B 37/0272* (2013.01); *H05B 37/0281* (2013.01); *Y02B 20/42* (2013.01); *Y02P 60/149* (2015.11)

(56) References Cited

U.S. PATENT DOCUMENTS

| | | | |
|---|---|---|---|
| 2006/0032115 A1* | 2/2006 | Van Den Dool | A01G 7/045 47/17 |
| 2007/0052638 A1* | 3/2007 | May | G03B 21/56 345/84 |
| 2010/0014096 A1* | 1/2010 | Alameh | A01M 21/00 356/484 |
| 2010/0076820 A1 | 3/2010 | Loebl et al. | |
| 2010/0281771 A1* | 11/2010 | Kudo | A01G 7/045 47/58.1 LS |
| 2010/0289411 A1* | 11/2010 | Snnits | A01G 7/045 315/113 |
| 2011/0115385 A1 | 5/2011 | Waumans et al. | |
| 2012/0054061 A1* | 3/2012 | Fok | A01G 31/00 705/26.5 |
| 2013/0139437 A1* | 6/2013 | Maxik | H05B 37/02 47/58.1 LS |
| 2014/0168412 A1* | 6/2014 | Shulman | H04N 7/18 348/89 |
| 2014/0250778 A1* | 9/2014 | Suntych | A01G 7/045 47/1.4 |
| 2014/0258173 A1* | 9/2014 | Blanchard | G06F 19/00 705/348 |
| 2014/0259920 A1* | 9/2014 | Wilson | A01G 31/02 47/62 R |

FOREIGN PATENT DOCUMENTS

| | | |
|---|---|---|
| JP | 2003-143959 A | 5/2003 |
| JP | 2011-177127 A | 9/2011 |
| JP | 2012-170361 A | 9/2012 |
| WO | 2011/115123 A1 | 9/2011 |
| WO | 2011115123 A1 | 9/2011 |
| WO | 2011/125382 A1 | 10/2011 |
| WO | 2012/063455 A1 | 5/2012 |
| WO | 2013/027198 A1 | 2/2013 |

* cited by examiner

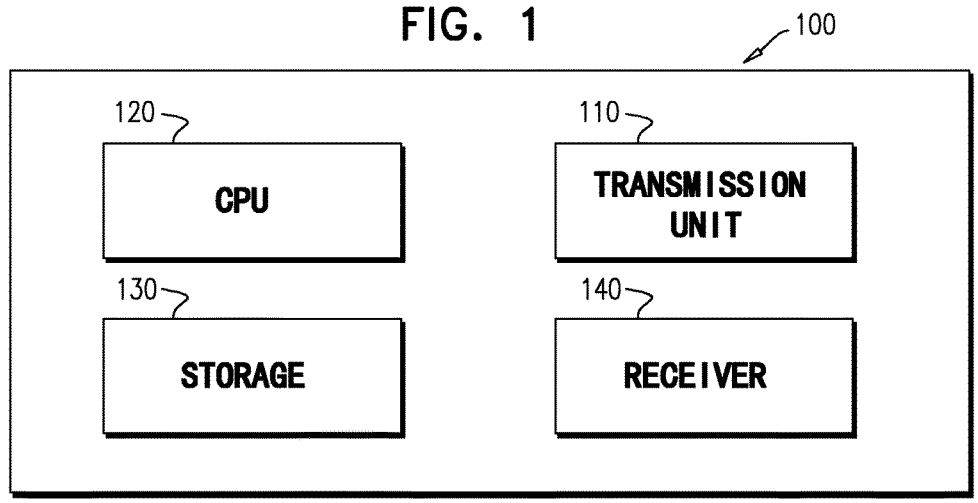
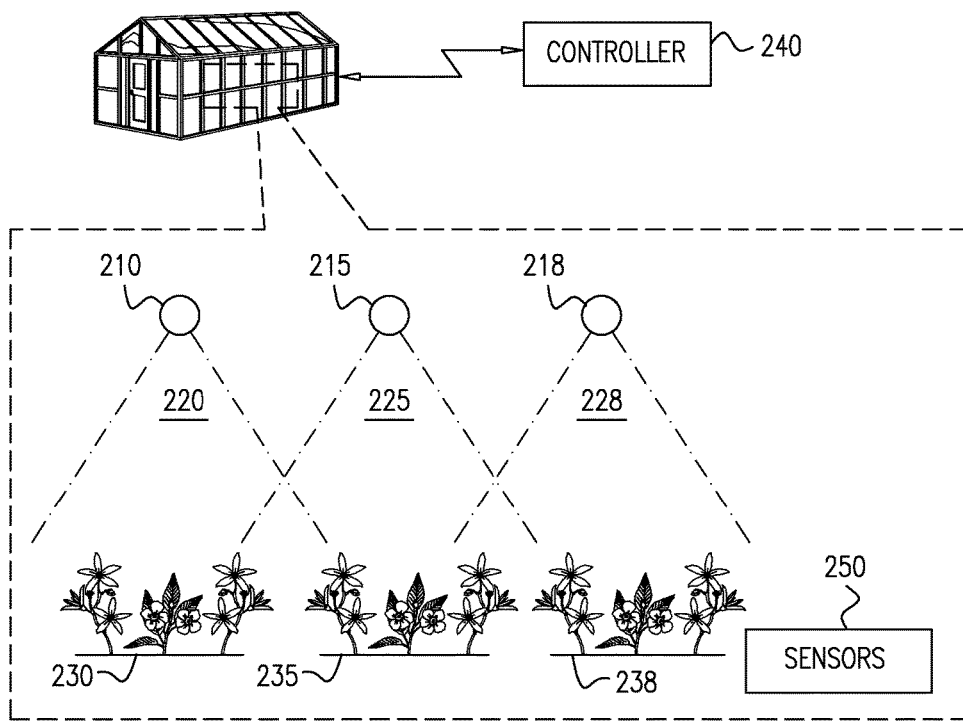

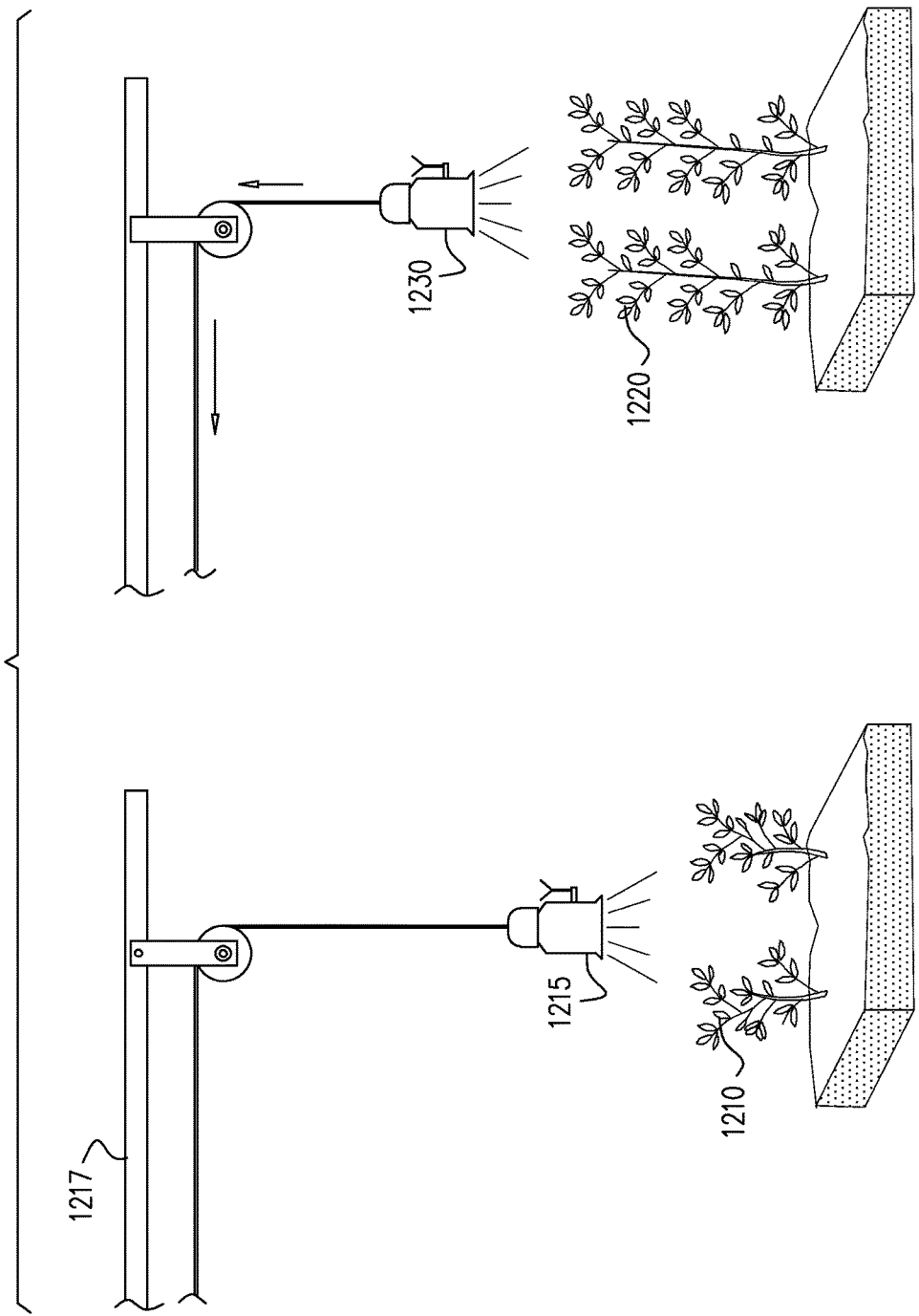

SYSTEM AND METHOD FOR PROVIDING ILLUMINATION TO PLANTS

FIELD OF THE INVENTION

The present invention relates generally to plant illumination, more specifically to illumination on plants in a pulse manner

BACKGROUND

Research on pulsed illumination for increased efficiency of plant growth has been going on for over a century. In 1905, Brown and Escombe found, using a rotating sector, that three-quarters of the light can be cut out without decreasing the rate of photosynthesis, and that the photosynthetic efficiency of light utilization in certain plants increased by more than 100% in intermittent light. Warburg (1919) found that Chlorella grew better under intermittent light than under continuous light, depending on the frequency of the light pulse. With a frequency of 4 pulses per minute (0.067 Hz) the improvement was 10% and with a frequency of 8000 periods per minute (133 hz) it was 100%. Emerson and Arnold (1932) were able to improve plant yield by 400% by flashing 50 flashes per second (50 Hz) and making the light period much shorter than the dark period. The photosynthetic efficiency of using pulsed, intermittent light translates into both significant savings in the cost of plant growth for the industrial market and an eco-friendly reduction in the need for electricity in industrial plant grown.

There are many studies that show the advantage in illuminating on plants using LEDs, while illuminating in a predefined wave length, for example only blue photons in the range of 420-470 nm. Illumination using LEDs may prevent the need to cool the area in which plants grow, as the amount of radiation is controlled and limited.

SUMMARY OF THE INVENTION

It is an object of the subject matter to disclose a system for illuminating plants in an indoor site, comprising a plurality of illumination units for emitting light in intermittent pulses; a central unit connected to the plurality of illumination units for synchronizing the operation of the plurality of illumination units, such that two or more plants clusters receive light in intermittent pulses emitted in the same time. The synchronization may be performed via wireless means, for example via a wireless transceivers located in each of the plurality of illumination units.

In some cases, the system further comprises a sensor unit for detecting data related to the growth of plants in the indoor site. In some cases, the sensor unit comprises an image capturing device for detecting visual parameters of the plants. In some cases, the system further comprises a transmitter for transmitting the related to the growth of plants to a remote location. In some cases, at least a portion of the plurality of illumination units comprises a plurality of light emitters that emit light in two or more wavelengths simultaneously.

In some cases, the plurality of light emitters emit several different wavelength ranges; wherein the light of each region is separately pulsed based on a duty cycle.

In some cases, each of the plurality of illumination units comprise a wireless communication unit; wherein the operation of the plurality of illumination units is synchronized in a wireless manner.

In some cases, at least a portion of the plurality of illumination units comprises a plug-in assembly to be screwed or inserted into a standard socket. In some cases, the central unit resides in a remote location outside the indoor site. In some cases, the central unit resides in one of the plurality of illumination units. In some cases, at least a portion of the plurality of illumination units comprises a communication unit for receiving an illumination plan. In some cases, the central unit transmits the illumination plan to the communication units of the plurality of illumination units. In some cases, the plurality of illumination units emit light in a controlled wavelength and intensity. In some cases, the plurality of illumination units emit infra-red pulses that heat the plants. In some cases, at least a portion of the plurality of illumination units are connected to a cooling unit that uses gas or liquid for cooling the plurality of light emitters. In some cases, the central unit also controls pulse duty cycle and frequency of the plurality of illumination units in different wavelengths of the light spectrum in a synchronized manner.

It is an object of the subject matter to disclose a method of illumination on plants in an indoor site, comprising obtaining sensor data sensed by a sensor unit in the indoor site; transmitting the sensor data to a computerized server located outside the indoor site; adjusting an illumination plan to be applied in the indoor site according to the sensor data. In some cases, the method further comprises transmitting the adjusted illumination plan to the indoor site. In some cases, the method further comprises obtaining financial data and market demands and adjusting an illumination plan to be applied in the indoor site according to the financial data. In some cases, the method further comprises obtaining a weather forecast and adjusting an illumination plan to be applied in the indoor site according to the weather forecast.

In some cases, the method further comprises obtaining data concerning former problematic situations; comparing images of former problematic situations with current images taken from various indoor sites; predicting a problematic situation according to the comparison. In some cases, the method further comprises measuring a distance between an illumination unit that emit light in the indoor site to a plant canopy in the indoor site.

In some cases, the method further comprises adjusting the height of the illumination unit in case the distance is smaller than a predefined threshold. In some cases, the method further comprises reducing the light intensity emitted from the illumination unit in case the distance is smaller than a predefined threshold. In some cases, adjusting an illumination plan comprises adjusting an illumination parameter of the light emitted by at least a portion of illumination units in the indoor site.

In some cases, the illumination parameter is wavelength. In some cases, the illumination parameter is duty cycle. In some cases, the illumination parameter is frequency. In some cases, the illumination parameter is light intensity. In some cases, the illumination parameter is an angle between a light emitter in the illumination unit and a canopy of the plant. In some cases, illumination units comprise two or more light emitters, wherein adjusting the illumination plan of a portion of the two or more light emitters. In some cases, the illumination plan comprises light pulses emitted in an intermittent manner.

BRIEF DESCRIPTION OF THE FIGURES

The present invention will be understood and better appreciated from the following detailed description taken in conjunction with the drawings. Identical structures, elements or parts, which appear in more than one figure, are generally labeled with the same or similar number in all the figures in which they appear, wherein:

FIG. 1 shows a computerized system for controlling the plurality of illumination units, according to exemplary embodiments of the subject matter;

FIG. 2 shows an area in which plants are illuminated using a plurality of illumination units, according to exemplary embodiments of the subject matter;

FIG. 12 shows a movable illumination unit, according to exemplary embodiments of the present invention.

DESCRIPTION OF THE INVENTION

Figure 3:
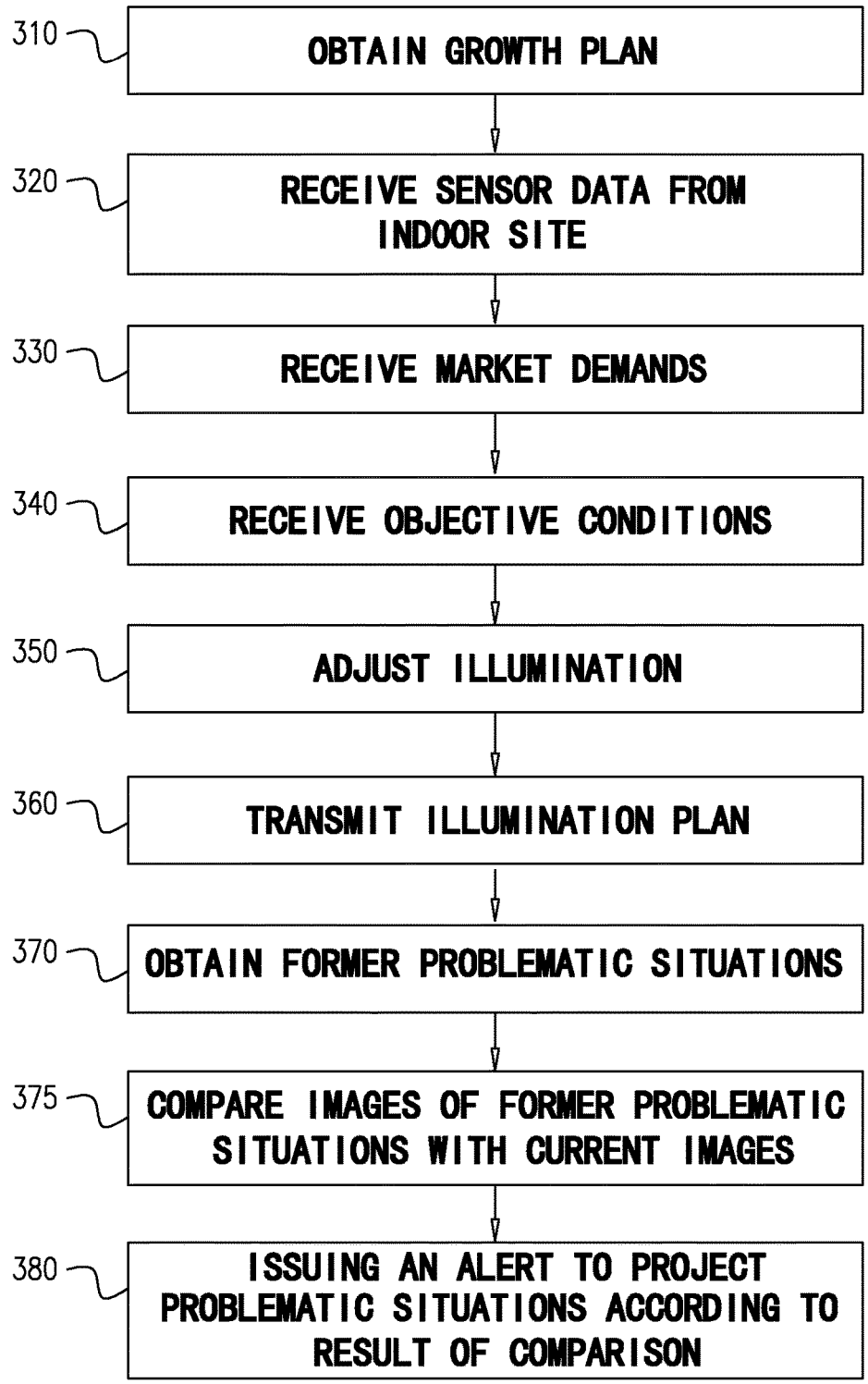
FIG. 3 shows a computerized method for controlling the operation of a plurality of illumination units, according to exemplary embodiments of the subject matter.

The subject matter discloses a system and method for plants illumination. The system comprises a plurality of illumination units located in a predefined area, at least two of the plurality of illumination units emit light in an intermittent manner. The system also comprises a control unit connected to the plurality of illumination units for determining the properties of light emitted by at least two of the plurality of illumination units. The control unit is also configured to synchronize the signals emitted by the plurality of illumination units and obtain measurements from the sensors attached to the illumination units in order to improve growth of the plants.

FIG. 1 shows a computerized system for controlling the plurality of illumination units, according to exemplary embodiments of the subject matter. The computerized system 100 is a user's standard electronic device, such as a laptop, telephone, tablet or PC, in which an interface is used to control the performance of the illumination units. The computerized system 100 comprises a transmission unit 110 for transmitting commands issued by the user of the computerized system 100 to the plurality of illumination units. The transmission unit 110 may be of wireless transmission, communicating with a receiver in each of the plurality of illumination units. Transmission may alternatively be implemented in a wired network or on the power grid of the plurality of illumination units. The user may control the operation of the plurality of illumination units from a remote location, for example from an office or from home.

The computerized system 100 comprises a processing unit 120. The processing unit 120 is configured to determine the illumination parameters of the plurality of illumination units, for example according to a predefined set of rules stored in a storage 130. The storage 130 may be a memory of the computerized device adapted for the software used by the user to manage the illumination of the indoor site. The software may be a mobile application running on an electronic device. The storage 130 may be a plurality of rules or growth plans stored in the client side of the mobile application. Determination of the illumination parameters may be applied in real time according to a command from the user controlling the illumination units or via a remote server. In some exemplary cases, the illumination parameters are determined at the beginning of a growth plan, for example of a one month duration. The parameters are then transmitted to the plurality of illumination units, each of which also comprise a processing unit.

The computerized system 100 may also comprise a receiver 140 for receiving signals from an external entity. The external entity may be sensors located in the area illuminated by the plurality of illumination units. Data from such sensors may be inputted into the processing unit 120 to adjust the illumination provided to the plants by the plurality of illumination units. The receiver may also receive signals from a remotely located server that transmits updates to the farm in which the illumination system operates. The remote server may receive data from a plurality of locations and adjust the growth plan accordingly. The server may also receive instructions or data related to events that occur in the indoor site from the farmer operating from a remote location. The remote server may transmit data according to objective information such as weather changes. The receiver 140 may receive data from the remote server via a modem or a cabled network.

FIG. 2 shows an area in which plants are illuminated using a plurality of illumination units, according to exemplary embodiments of the subject matter. The area 200 includes a plurality of plants 230, 235, 238, illuminated by a plurality of illumination units 210, 215, 218. The area 200 may be defined by walls, as an indoor location for growing plants, such as flowers, vegetables and the like. At least some of the plurality of illumination units 210, 215, 218 are connected to a control unit 240, similar to the computerized unit of FIG. 1. The plurality of illumination units 210, 215, 218 emit light, for example via LEDs or other controlled emitted signals. The plurality of illumination units 210, 215, 218 may also emit a signal that heats a plant, according to the wave length of the signal emitted by an illumination unit. The signals emitted by the plurality of illumination units 210, 215, 218 are emitted into a predefined effective area, for example according to the opening angle of each LED, or the illumination between the light emitter and the plants, according to parameters associated with signal strength and the like. For example, illumination unit 210 emits signal into effective area 220, illumination unit 215 emits signal into effective area 225 and illumination unit 218 emits signal into effective area 228.

The plurality of illumination units 210, 215, 218 emit signals in an intermittent pulsed manner. That is, intermittently, according to a predefined illumination program that matches growth plans and time tables. The pulsed illumination is synchronized, at least partially, to improve efficiency and reduce energy consumption. In some exemplary cases, only part of the illumination is synchronized between a plurality of illumination units. For example, red light is emitted all the time but clue light is emitted in pulses and synchronized between five (5) illumination units that provide light to a cluster of plants. The control unit 240 is configured to synchronize the signals emitted by the plurality of illumination units 210, 215, 218, improve plants growth and save electrical power. For example, as there is some overlap between the effective areas of some of the illumination units, both illumination units 210 and 215 emit light into plant 225. If the timing of the emitted light is not synchronized, the plant 225 or the area illuminated by both illumination units 210, 215, will absorb different amounts of light over time or any other manner of illumination that does not conform to the growth plan.

The control unit 240 is configured to receive information from a sensor unit 250 and adjust the illumination program accordingly. The sensor unit 250 may include a camera to take images of the plants. The sensor unit 250 may comprise a sensor that measures the distance between illumination unit and the plant. Adjusting the illumination program comprises changing the wavelength, amplitude, frequency, duty cycle, distance between the illumination unit and the plants and the like. In some cases, the illumination units comprise a cooling unit, for example by emitting a predefined gas or liquid towards the light emitters. In such as case, the gas is stored in the illumination units or conveyed to the illumination units via pipes from a gas storage. The control unit 240 may also control pulse duty cycle and frequency in different wavelengths of the light spectrum, for example via RF signals transmitted to communication units of the plurality of illumination units 210, 215, 218. In some cases, the control unit 240 communicates with a central illumination unit that forwards the commands to other illumination units. The control unit 240 may control the duty cycle of each light emitter in each of the plurality of illumination units 210, 215, 218, that is, for example in the range of 1-99%. The control unit also controls the frequency and intensity of the light emitted from the light emitters, as well as wavelength. The control unit 240 may send a command to adjust the illumination plan of only a portion of the light emitters in an array of illumination units. For example, to adjust the pulses of blue LEDs without changing the pulses of red LEDs.

FIG. 3 shows a computerized method for controlling the operation of a plurality of illumination units, according to exemplary embodiments of the subject matter. In step 310, the server obtains growth plans for plants located in indoor sites. The growth plans include data regarding target dates, illumination to be provided in various time segments until the target date, projected size and color of the plants until the target date and the like. In some cases, the growth plans are different for the same plant in different sites, according to the location of the different sites, for example one in Canada and another in the USA.

In step 320, the server receives sensor data from the plurality of indoor sites for growing plants. The sensor data may be environmental data, such as humidity and temperature. The sensor data may be provided via images or video, such as size of a specific plant, color, shape, distance between illumination unit and plant to maintain certain illumination strength and the like. The sensor data may indicate a level of toxicity or presence of materials found in a specific indoor site.

In step 330, the server receives market demands. This step is optional only and provides the server with projected demands for the site in various segments, such as dates and geographic distribution. The server is capable of adjusting the target date of at least a portion of the plants in a specific indoor site according to market demands as provided by external resources, such as a flower stock market. The market demands may also be projected prices for specific dates. Controlling the target date of the plants may be achieved by controlling the timing in which illumination is changed from vegetative stage to flowering stages by controlling light duration and light spectrum.

In step 340, the server receives objective conditions that may affect the growth plan. The objective conditions may be weather in a specific region, change in transportation costs, change in transport congestion in specific dates and the like.

In step 350, the server adjusts the illumination plan for at least a specific area in a specific indoor site. The illumination plan may be affected by wavelength, heat, controlling, frequency and duty cycle of pulses applied on the plants and the like. The system learns about optimal growth condition by obtaining data from remote locations.

In step 360, the server transmits the updated illumination plan to the indoor site. The transmission may be performed via the internet, via a cable network, wirelessly or in other methods desired by a person skilled in the art.

Step 370 discloses obtaining data concerning former problematic situations, such as delay in growth of plan, change in leaf color, change between projected plant size and actual plant size, presence of pests in the plant cluster and the like. The data may be provided via sensors, such as image capturing devices. In some exemplary cases, when a problematic situation is identified, the computerized system of the present invention analyzes images taken on the same problematic plant, or plant cluster, before the problematic situation was identified, for example 3 images per day, in the week before identifying the problematic situation. The computerized system may only store characteristics of those images, such as shapes and colors of objects in the image or objects in the plant.

Step 375 discloses comparing images of former problematic situations with current images taken from various indoor sites. The comparison may be performed according to the entire image, for example by matching objects in the images, or upon recognizing characteristics in the current images that were also found in the images taken before identifying the problematic situation. Then, a value may be provided to define the resemblance between the previous set of images and the current set of images. In step 380, in case the value is higher than a predefined threshold, an alert may be issued inform that a problematic situation is predicted according to result of comparison.

Figure 4:
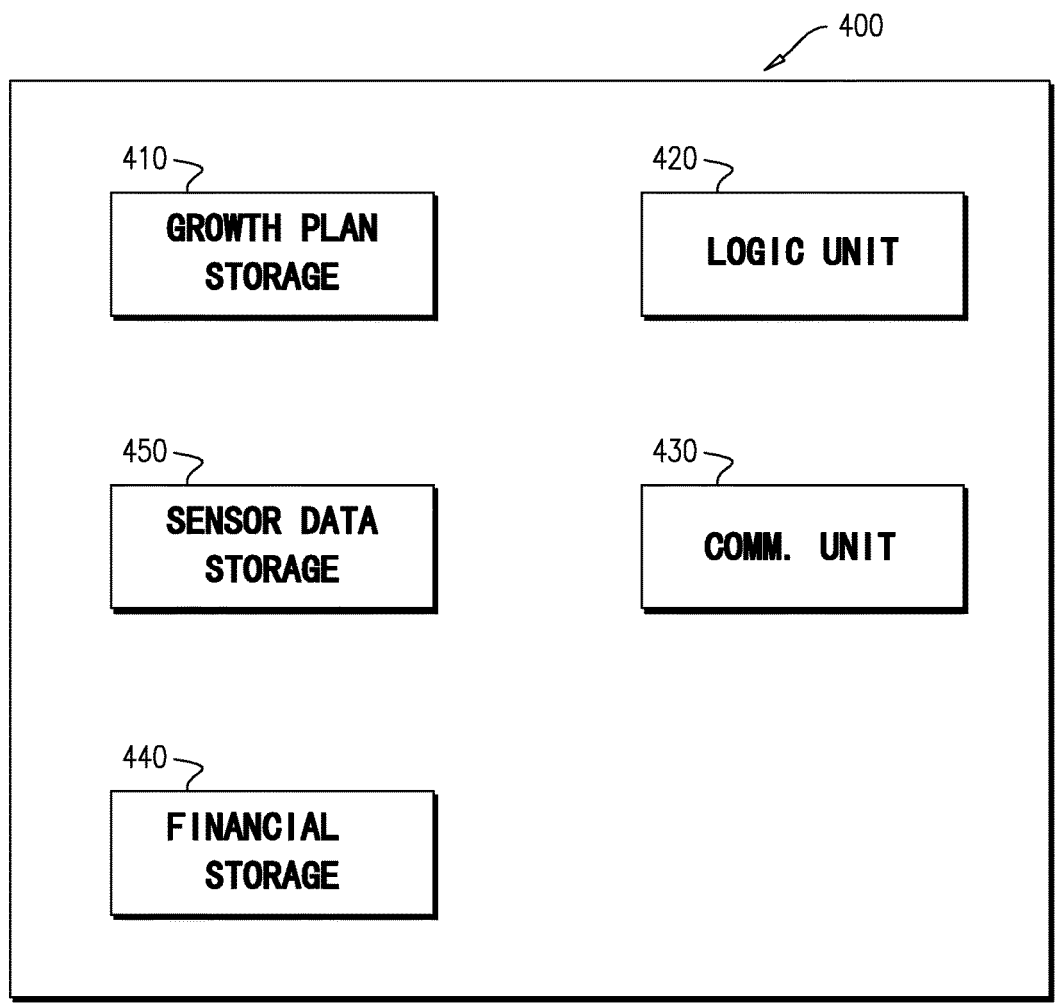
FIG. 4 shows a computerized server for controlling the operation of a plurality of illumination units from a remote location, according to exemplary embodiments of the subject matter.

FIG. 4 shows a computerized server for controlling the operation of a plurality of illumination units from a remote location, according to exemplary embodiments of the subject matter. The server 400 may be located in a different country from the plurality of indoor sites and receive results of plant growth via a communication unit 430. The communication unit 430 may be connected to the internet or to any other network which provides wired or wireless communication with remote sites. The communication unit 430 may also transmit data to the remote sites, for example updates in growth plans of plants in the remote sites, updates in illumination plans, heating plans and the like. The updates sent by the communication unit 430 to the remote agricultural sites are determined by a logic unit 420. The logic unit 420 may comprise a processor and performs calculations and estimations according to a predefined set of rules stored in a storage. The logic unit 420 may be updated by a user of the server 400 or by downloading software. The logic unit 420 may receive information from a sensor data storage 450 which stores sensor data received from remote agricultural sites. The sensor data may include temperature, humidity and other measurements made by sensors in the remote agricultural sites. The sensor data may contain size, colors and shape of plants in the remote agricultural sites, for example as provided by a manager of the remote agricultural sites or automatically by a sensor unit of the remote agricultural sites, such as an image capturing device. The logic unit 420 may also receive information from a growth plan storage 410 which stores growth plans for various plants and plants types in the remote agricultural sites. The growth plans may contain target dates for the plants, for example the date in which the plant is ready to be marketed. The growth plan may also indicate a date in which the plant should, reach a flowering stage, reach a predefined size and the like. The logic unit 420 may compare the data stored in the growth plan storage 410 and the actual growth as stored in the sensor data storage 450 to determine if any updates in the illumination units are required. In some exemplary cases, there is a change only in a specific cluster in a site, and ten (10) other clusters of the same plants are detected to grow according to the growth plan. In such a case, the logic unit 420 may transmit an alert via the communication unit 430 to the specific site, referring to the problematic cluster.

In some exemplary cases, the server 400 also comprises a financial storage 440 which stores market demands and projected prices for specific plants, in specific geographic areas. For example, in Chicago there is a need for 4000 roses on Sunday, at the specific price and in new York there is a need only for 1500 roses on Sunday, but for 5000 roses on Wednesday, for example as there is a big convention. The logic unit 420 may use the financial data in order to change target dates in the growth plan of plants in the remote agricultural sites and to adjust the illumination plans accordingly. For example, some specific pulses may delay the flowering of flowers.

Figure 5:
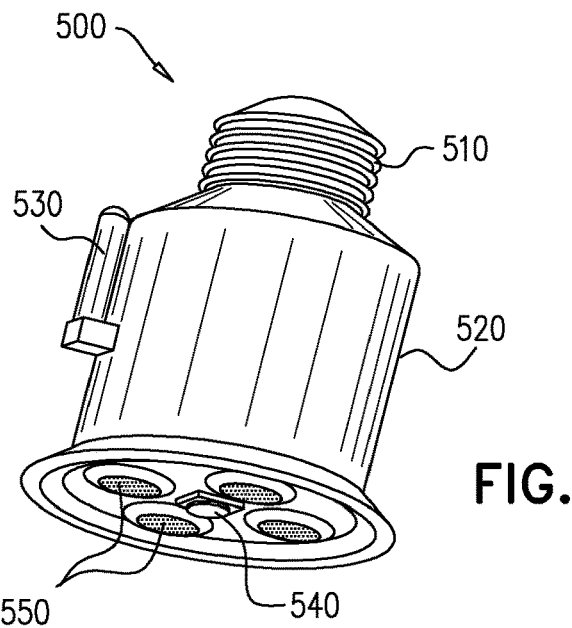
FIG. 5 schematically shows an illumination unit for an indoor site, according to exemplary embodiments of the subject matter.

FIG. 5 schematically shows an illumination unit for an indoor site, according to exemplary embodiments of the subject matter. The illumination unit may be controlled from a remote server or work in a predefined and constant illumination plan. The illumination unit 500 may be designed as a set of a plug-in lighting, heating and monitoring assembly. In some cases, a plurality of such illumination units are controlled by a control unit in the indoor site or in a remote location. When designed according to FIG. 5, the plug-in assemblies 510 screw into standard sockets. In some other cases, the illumination unit 500 is connected to an AC-DC plug. In this preferred embodiment the illumination unit 500 comprises a communication board 530 and antenna for the transmission of growth parameters and the receipt of illumination and heating plans. The illumination unit 500 comprises a body 520 in which a plurality of lighting modules 550 such as LED lights for heating and lighting purposes. The illumination unit 500 may also comprise an imaging device 540 for monitoring growth of plants located in the vicinity of the illumination unit 500. The illumination unit 500 is placed over cluster of plants. The cluster of plants is defined according to the lighting and heating range of the lighting modules 550 incorporated in the illumination unit 500.

Figure 6:
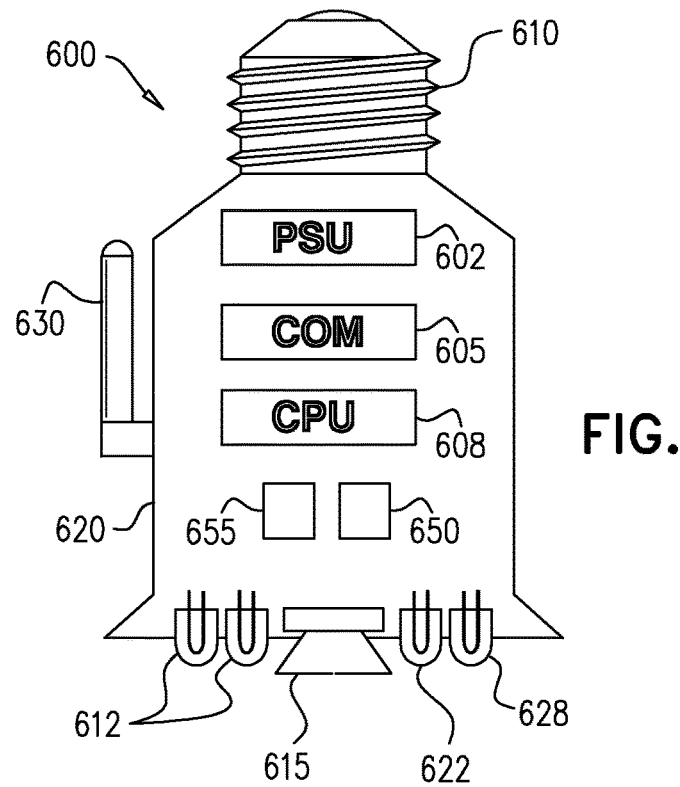
FIG. 6 schematically shows the components of the illumination unit, according to exemplary embodiments of the subject matter.

FIG. 6 schematically shows the components of the illumination unit, according to exemplary embodiments of the subject matter. The illumination unit 600 comprises at least one light emitting devices, such as LED light emitters that emit light in blue and red spectral ranges 622, any other spectral range desired by a person skilled in the art. The illumination unit 600 may also include light emitters 625 that emit light in a wavelength near the infrared ranges or white light emitters for human monitoring purposes. The illumination unit 600 comprises a power supply unit 602 that receives power from the electricity grid. In some cases, the electronic modules of the illumination unit 600 are encased in a housing 625, for example an AC/AD converter 605, a communication unit with either wired or wireless RF transmitters and receivers, including an antenna 630 which may either be placed externally to the housing 625 or printed on a communications card or transmission through the electrical wires. The illumination unit 600 also comprises a processing unit 608 for processing commands received via the antenna 630 and translate them into pulses applied by the light emitters 622, 625 to the plants. The illumination unit 600 may also include software used by the processing unit 608 to determine the illumination and heating plans. The illumination unit 600 may also include a plurality of sensors, such as a thermometer, humidity sensor and an imaging module 615. The illumination unit 600 may also include an optical or sonar sensor to determine a distance between the illumination unit 600 and the plant.

The illumination unit 600 may also comprise an air conditioning unit 650 for emitting air into the indoor site. Emission of air may be performed according to a command from a computerized device, for example in response to a predefined event, or may be performed constantly, to cool the area and cause circulation of air in the indoor site. The illumination unit 600 also comprises a pulse generator 655: The pulse generator 655 generates pulses according to which the light emitters of the illumination unit 600 emit light. The pulse generator receives parameters such as frequency and duty cycle from the communication unit and translates them into commands to the light emitters.

Figure 7:
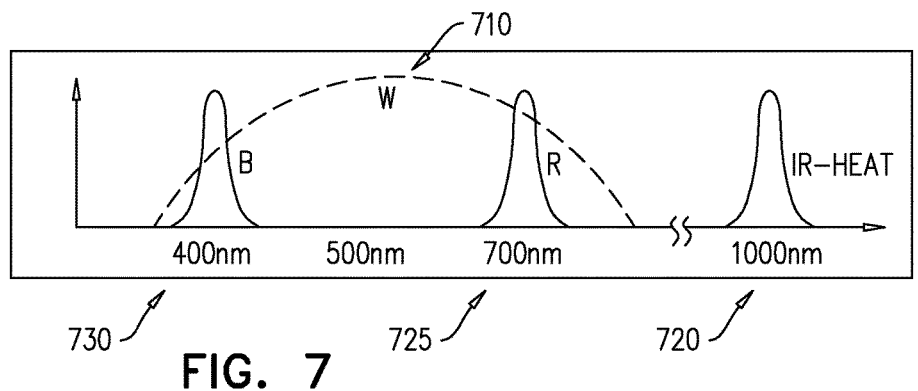
FIG. 7 shows a detailed representation of the four lights emitted by an illumination unit, according to exemplary embodiments of the subject matter.

FIG. 7 shows a detailed representation of the four lights emitted by an illumination unit, according to exemplary embodiments of the subject matter. The number of different and independently emitted lights or other type of signals may be determined according to the need of the growth plan or for a specific type of plant. For example, an illumination unit mounted over a region for growing tomatoes is provided with 3 LEDs while an illumination unit mounted over a region for growing roses is provided with 5 LEDs having different wavelength ranges and a camera. The illumination unit of FIG. 7 emits 4 types of signals in order to carry out a growth plan: a red light 725, with a wavelength region for 640 nm to 690 nm, a blue light 730, with a wavelength region from 420 to 470 nm, a white light 710 with a wavelength range covering the visible spectrum and a signal in the range of the infrared spectrum 720. The red and blue lights are in those spectral ranges which are mostly responsible for photosynthesis, phototropism and photo-morphogenesis, the infrared LED light is responsible for heating, and the while light enables accurate imaging using the illumination unit.

Figure 8:
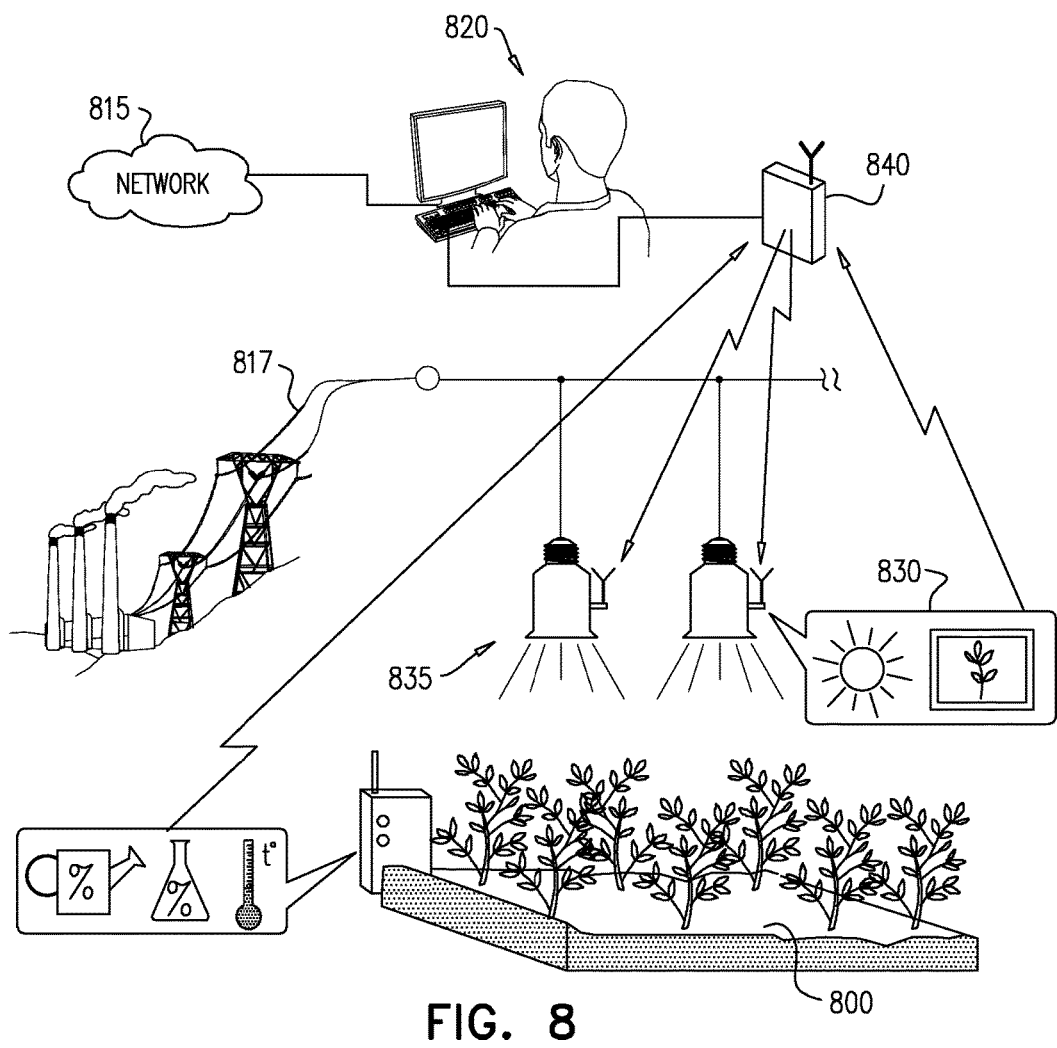
FIG. 8 shows a centrally controlled, plant growth system, according to exemplary embodiments of the present invention.

FIG. 8 shows a centrally controlled, plant growth system, according to exemplary embodiments of the present invention. FIG. 8 also provides an overview of the method used to control and monitor plant growth as detailed below. The system comprises a plurality of illumination units 835. The plurality of illumination units 835 may be of varying amounts per growth site, may be designed to include a plug-in module for easy installation, and may include heating and monitoring capabilities. The number of illumination units 835 may depend on the amount of plants to be grown in each site 800, size of sites, type of plants and additional relevant parameters. The plurality of illumination units 835 may be connected to electricity by light bulb sockets 817. The plurality of illumination units 835 may be connected to electricity by an AC/DC socket. The plurality of illumination units 835 may be connected to a wireless router 840 case the commands from the person managing the illumination in the indoor site sends the commands form a remote location. The wireless router 840 may then send the commands to the communication units in the plurality of illumination units 835.

In some exemplary embodiments, plurality of illumination units 835 may receive updates to the illumination plan from the central server that contains software for managing receipt of inputs and transmission of outputs as well as for managing internet connectivity, generation of pulses to be emitted by the illumination units in each remote site 800. The signals sent by the central server generate light pulses at a pre-determined frequency and pre-determined duty cycles for each kind of light emitters in accordance with a growth plan of plants associated with the specific illumination unit. The properties of the pulses, such as duty cycle and wavelength, may change online during plant growth stages. In some cases, the illumination units do not provide pulses but constant light according to the parameters determined by the central server. The central server may determine the signal sent to the illumination units according to data stored in an internet-based growth plan database and resource center 815. In some exemplary embodiment, the growth plan can also include watering instructions, fertilizing time and quantities. The growth plan may be created by the database and resources center 815 based on the following inputs: (a) growth input and output parameters provided by a person 820 in charge of analyzing data from the remote sites 800, for example from sensors or from the illumination units; (b) data relevant to monitoring plant growth, such as temperature, chemical concentration, CO2 levels and humidity, received from additional sensors placed among the plants which are grown by means of the system, and, (c) relevant data that can be extracted from the internet.

Figure 9:
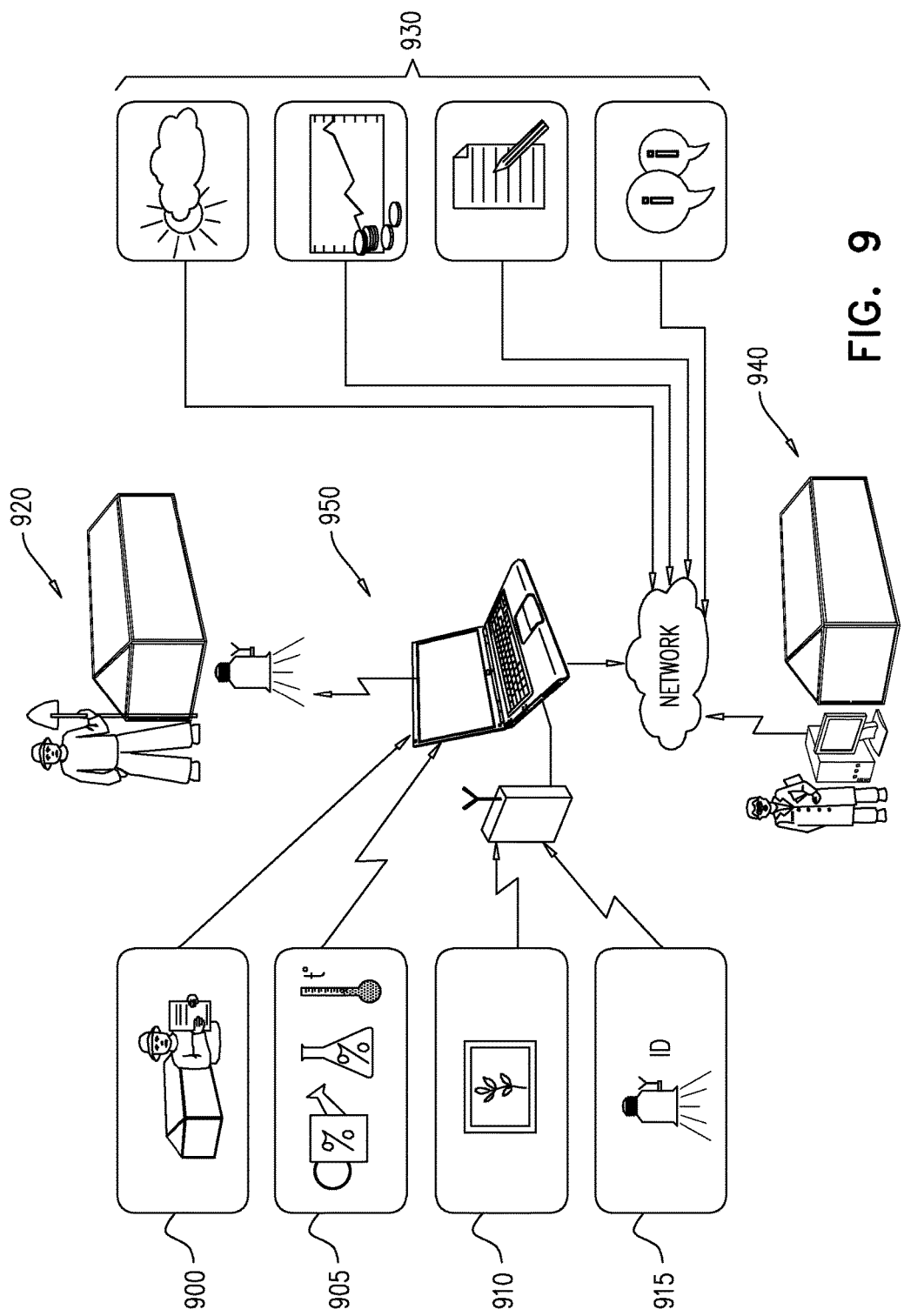
FIG. 9 shows in detail the inputs used to create a growth plan according to exemplary embodiments of the present invention.

FIG. 9 shows in detail the inputs used to create a growth plan according to exemplary embodiments of the present invention. Each grower using the invention has a computerized program installed on an electronic device such as a PC, tablet or telephone that collects and sends the resource center data from three sources: illumination units 950, the person in charge of the growth site 920, and sensors 905 placed in the growth site 920. The illumination units 950 may provide plant images 910 when containing image capturing devices. The plant images 910 contain data subject to analysis, such as plant color and leaf size, or sick plants that require pest control, as well data on lighting conditions and an identification number 915 for each of the illumination units 950. The sensors 905 detect and provide environmental data such as temperature, chemical concentration of pre-defined materials and humidity around the plant growth environment. Other information provided to the server may be identified by the person in charge of the growth site 920 such as the type of plant being grown and its location in the site and a geographic location of the site. When an alert is sent, the information will also include the location of sick plants in the site. The person may input parameters such as growth goal parameters, such as desired date for completion of a plant flowering process, desired size and quantities. The inputs sent by the server may then be integrated into the database and resources center, along with the following additional inputs: (a) internet-based information pertinent to creating a plant growth plan, such as weather forecasts and relevant financial conditions 930, and (b) results from previously devised and tested growth plans 940. The illustrated inputs are pushed to the internet-based growth plan database on an on-going basis, and accordingly, an altered growth plan may be automatically sent to a control unit of the site 920, based on the changes in input received.

Figure 10:
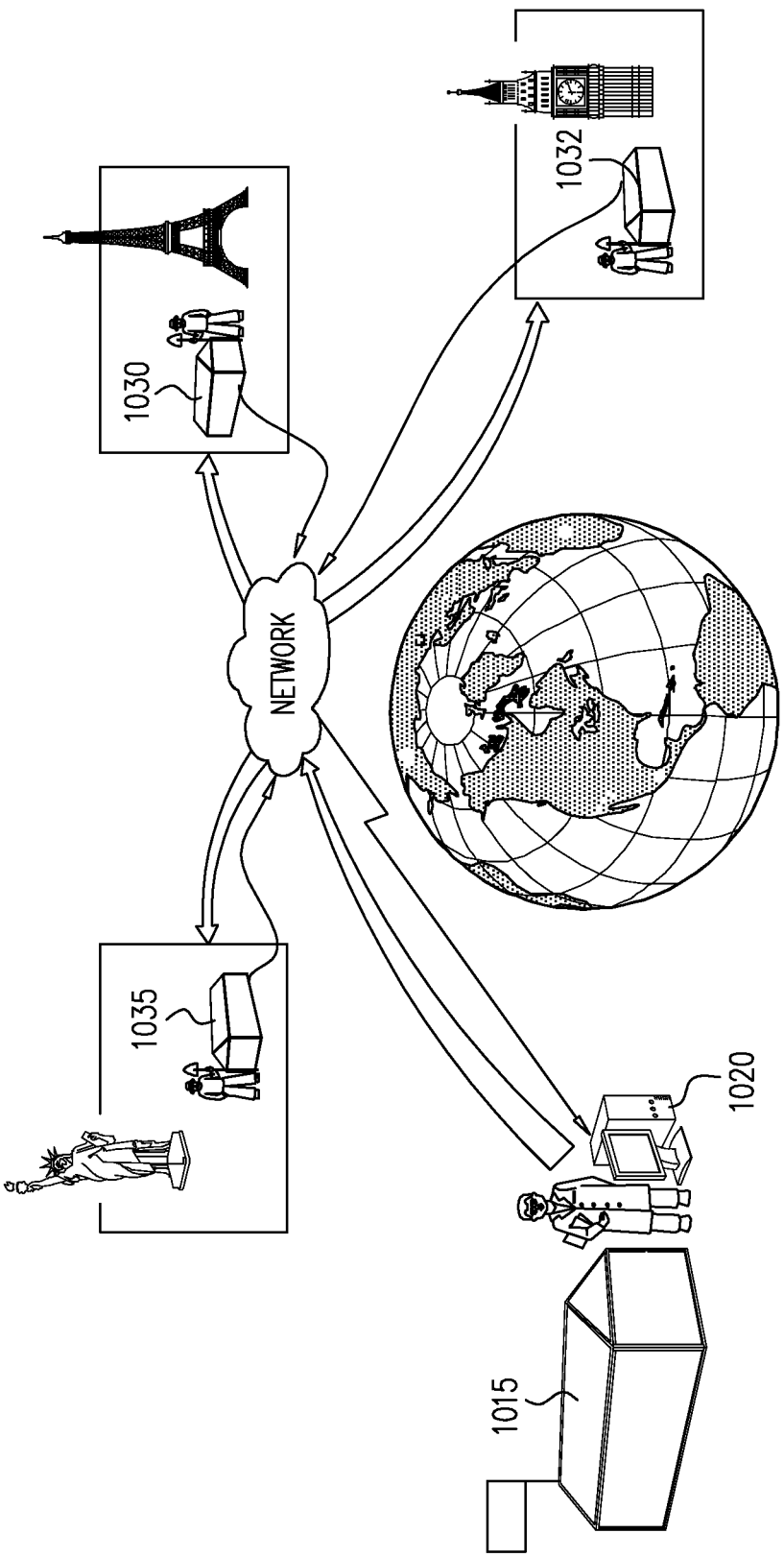
FIG. 10 illustrates a method and process for improving growth plans, according to exemplary embodiments of the present invention.

FIG. 10 illustrates a method and process for improving growth plans, according to exemplary embodiments of the present invention. The process provides for transmitting data from a plurality of remote sites 1030, 1032 and 1035 to a central server 1020. The data may be transmitted on a frequent basis, for example once per 15 minutes, or on demand, when there is a predefined event, such as an image detected in one of the remote sites 1030, 1032 and 1035, indicating a problematic cluster of plants. The central server 1020 may use date input from remote locations to learn the ideal growth condition in real time and adjust the illumination accordingly The on-going flow of data from remote sites 1030, 1032 and 1035 to the central server 1020 can be complied and analyzed along with results from internal research and testing conducted at a database and resource center 1015, to optimize future growth plans.

Figure 11:
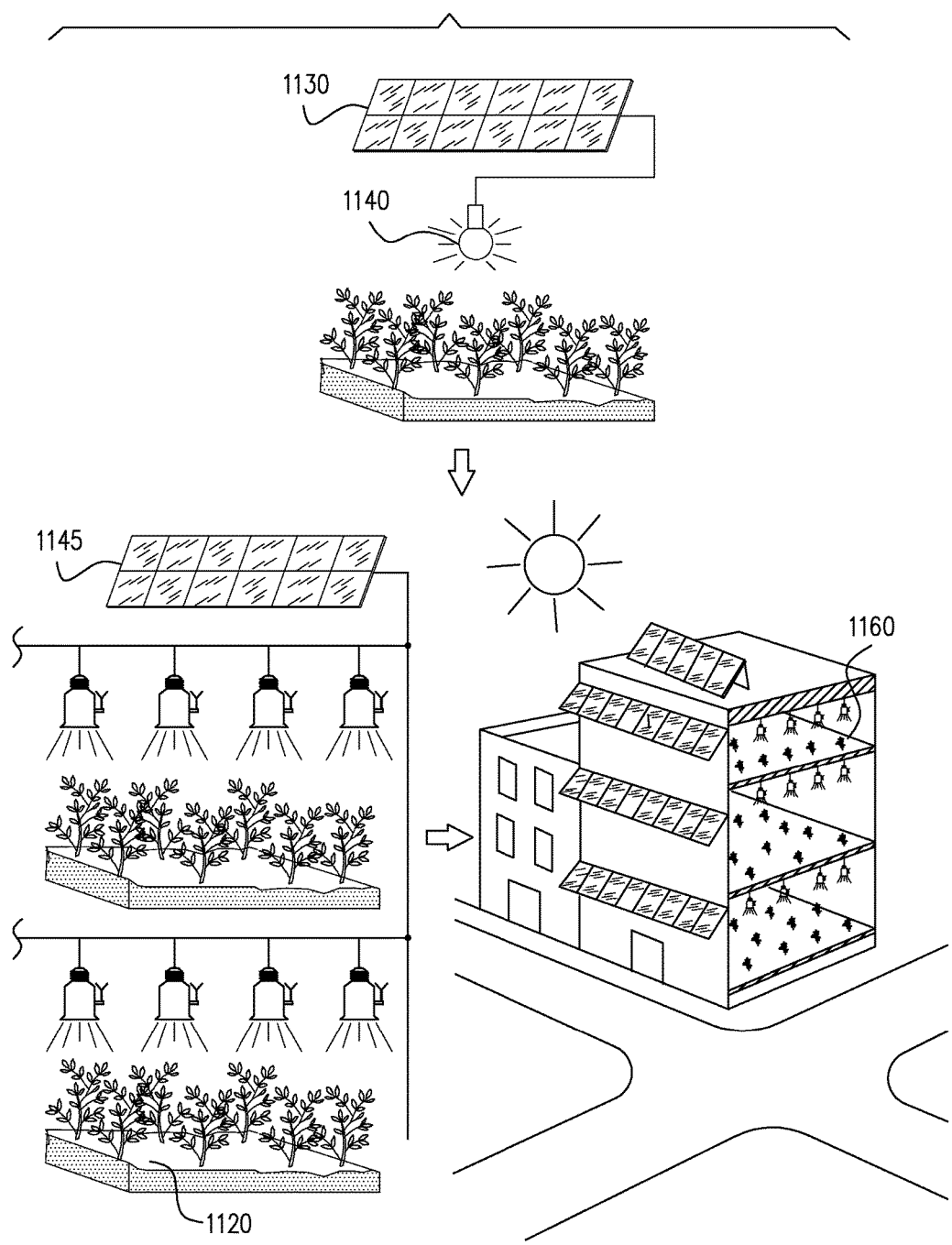
FIG. 11 shows a plant growth site connected to solar panels, according to exemplary embodiments of the present invention.

FIG. 11 shows a plant growth site connected to solar panels, according to exemplary embodiments of the present invention. The electricity provided by a standard solar panel requires an average of 10 square meters of solar panels 1130 to provide electricity for one square meter of plant growth 1120. However due to the electricity efficiencies achieved by the invention through use of pulsed light and spectral illumination control, the ratio of square meters of solar panels 1145 to growth area 1120 can be reduced from 10:1 to 1:2. The efficiencies in energy and space created by use of the invention allows for more growth in urban settings 1160.

FIG. 12 shows a movable illumination unit, according to exemplary embodiments of the present invention. The illumination unit 1215 is mounted over a specific region in which a cluster of plants 1210 grow. The illumination unit 1215 comprises a sensor for measuring the distance between the canopy of the plants 1210 and the illumination unit 1215, for example via optical means, as the distance decreases when the plants grow. The illumination unit 1215 is connected to a mechanical element, such as an arm 1217 or a winch that move the illumination unit 1215 when the measured distance is smaller than a predetermined threshold. The threshold may vary between plants, or between growth stages. When the plant grows, as shown in plant 1220, the illumination unit 1230 is moved away from the plant 1220.

In some exemplary cases, the sensor which measures the distance between the plant and the illumination unit 1215 is located outside the illumination unit 1215, for example on a wall of the indoor site. In some other cases, the amplitude of light applied by the illumination unit 1215 is reduced when the plant grows, instead of moving the illumination unit 1215.

In some exemplary cases, the system of the subject matter captures images from cameras located in the indoor site when at least some of the plurality of illumination units emit light in a specific and predefined wavelength range. For example, the cameras capture images only when red light is emitted by a portion of the illumination units on cannabis plants. The red light enables the cameras to obtain additional data (in addition to data obtained when images are taken without illumination). Such additional information may be chlorophyll content and leaf bleaching.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the invention. Further combinations of the above features are also considered to be within the scope of some embodiments of the invention.

It will be appreciated by persons skilled in the art that the present invention is not limited to what has been particularly shown and described hereinabove. Rather the scope of the present invention is defined only by the claims, which follow.

The invention claimed is:

1. A system for illuminating plants in a plant growth site, comprising:
   a plurality of illumination units configured to emit light in intermittent pulses on a plurality of plants clusters, based on a duty cycle; wherein each illumination unit emits light into a predefined effective area,
      wherein each illumination unit of the plurality of illumination units, simultaneously illuminates two or more plant clusters, creating an overlap of illumination to each plant cluster when predefined effective areas overlap,
      wherein at least a portion of the plurality of illumination units comprises a communication unit configured to receive an individual illumination plan, for each plant cluster,
      wherein said illumination plan is comprised of illumination at one or more wavelengths in different frequencies in said duty cycle, and
      wherein the plurality of illumination units comprises a plurality of light emitters that emits one or more different wavelength ranges simultaneously,
   a central unit connected to the plurality of illumination units configured to adjust the operation of the plurality of illumination units, in a synchronized manner such that each one of the plurality of plants clusters receives light in intermittent pulses emitted at the same time from more than one illumination unit, wherein said synchronization prevents violation of said illumination plan for each individual plant cluster by preventing absorption of different amounts of light by said each one of the plurality of plant clusters receiving overlapping illumination from said plurality of illumination units and said synchronizing is performed via signals sent to at least a portion of the plurality of illumination units;
   a sensor unit configured to obtain data related to plants conditions;
   a control unit configured to receive said obtained data from said sensor unit, and accordingly to adjust said illumination plan,
   wherein said control unit is further configured to communicate with said central unit;
   wherein the central unit is configured to transmit said illumination plan to said communication unit of the at least portion of said plurality of illumination units, and
   wherein the sensor unit comprises an image capturing device, the image capturing device configured to capture images of the illuminated plants, and analyze the captured images to identify characteristics of the illuminated plants,
   a server configured to:
      (i) obtain data concerning former problematic situations;
      (ii) compare images of former problematic situations with current images taken by the image capturing device from various plant growth sites; and
      (iii) predict a problematic situation according to the comparison.

2. The system according to claim 1, further comprising a transmitter for transmitting said sensor data to a remote computerized server, wherein said computerized server transmits an updated illumination plan including optimal growth conditions to said central unit,
   wherein the updated illumination plan is based on data obtained from remote plant growth locations.

3. The system according to claim 1, wherein said computerized server is located in a remote location.

4. The system according to claim 1, wherein the operation of the plurality of illumination units is synchronized in a wireless manner.

5. The system according to claim 1, wherein the communication unit for receiving an illumination plan is operated in a wireless manner.

6. The system according to claim 1,
   wherein the plurality of illumination units emit light in a controlled wavelength and intensity, and
   wherein the central unit also controls pulse duty cycle and frequency of the plurality of illumination units in different wavelengths of the light spectrum in a synchronized manner.

7. The system according to claim 1, wherein the image capturing device is configured to capture images when pulses are emitted in a predefined wavelength by at least a portion of the plurality of illumination units.

8. The system of claim 1, the system further comprising:
   a logic unit that is configured to retrieve data from a growth plan storage which stores illumination plans for various plants types in remote plant growth sites; and
   a financial storage,
   wherein the logic unit is further configured to change a target date in the illumination plan in one or more plant growth sites according to: (i) data received from the growth plan storage; and (ii) data retrieved from the financial storage.

9. The system according to claim 8, wherein the financial storage includes stores market demands and projected prices for specific plants, in specific geographic areas.

10. A method for illumination of plants in a plant growth site, comprising:
    providing a plurality of illumination units configured to emit light in intermittent pulses on a plurality of plants clusters based on a duty cycle, wherein each illumination unit emits light into a predefined effective area,
    wherein each illumination unit of the plurality of illumination units, simultaneously illuminates two or more plant clusters, creating an overlap of illumination to each plant cluster when predefined effective areas overlap,
    wherein at least a portion of the plurality of illumination units comprise a communication unit configured to receive an individual illumination plan, for each plant cluster,
       wherein said illumination plan is comprised of one or more wavelengths in different frequencies in a duty cycle, and
    wherein the plurality of illumination units comprises a plurality of light emitters that emits one or more different wavelength ranges simultaneously, synchronizing operation of the plurality of illumination units by a control unit, such that each one of the plurality of plants clusters receives light in intermittent pulses emitted at the same time, from more than one illumination unit, adjusted by the control unit, wherein said synchronizing prevents violation of said illumination plan for each individual plant cluster by preventing absorption of different amounts of light by said each one of the plurality of plant clusters, when receiving overlapping illumination from said plurality of illumination units, and said synchronizing is performed by transmitting signals to at least a portion of the plurality of illumination units;

obtaining sensor data sensed by a sensor unit in said plant growth site;

receiving said obtained data from said sensor unit by a control unit, and accordingly adjusting said illumination plan;

sending the adjusted illumination plan by the control unit to the central unit;

transmitting by the central unit the adjusted illumination plan to said communication unit of the at least portion of the plurality of illumination units;

capturing images of the illuminated plants, and analyzing the captured images to identify characteristics of the illuminated plants by an image capturing device; and predicting a problematic situation by a server, wherein the predicting is a result of: (i) obtaining data concerning former problematic situations; and (ii) comparing images of former problematic situations with current images taken from various plant growth sites.

11. The method according to claim 10, further comprising measuring a distance between an illumination unit that emit light in the plant growth site to a plant canopy in the plant growth site.

12. The method according to claim 11, further comprises adjusting the height of the illumination unit in case the distance is smaller than a predefined threshold.

13. The method according to claim 10, wherein adjusting an, illumination plan comprises adjusting an illumination parameter of the light emitted by at least a portion of illumination units in the plant growth site.

14. The method according to claim 13, wherein the illumination parameter is selected from: wavelength, duty cycle, frequency, light intensity, and an angle between a light emitter in the illumination unit and a canopy of the illuminated plant.

15. The method of claim 10, further comprising:

transmitting said sensor data by a transmitter to a remote computerized server, wherein said computerized server transmits an updated illumination plan including optimal growth conditions to said central unit, and wherein the updated illumination plan is based on data obtained from remote locations.

16. The method of claim 10, the method further comprising:

retrieving data from a growth plan storage which stores illumination plans for various plants types in remote plant growth sites by a logic unit; and changing a target date in the illumination plan in one or more plant growth sites by the logic unit, according to data retrieved from the growth plan storage and from a financial storage.

17. The method of claim 10, wherein the synchronizing operation is performed in a wireless manner.

* * * * *